(12) United States Patent
Bauer

(10) Patent No.: US 9,946,098 B2
(45) Date of Patent: Apr. 17, 2018

(54) EYEWEAR WITH A CELLULAR GPS MODULE

(71) Applicant: Eddie Bauer, Houston, TX (US)

(72) Inventor: Eddie Bauer, Houston, TX (US)

(*) Notice: Subject to any disclaimer, the term of this patent is extended or adjusted under 35 U.S.C. 154(b) by 0 days.

(21) Appl. No.: 15/393,726

(22) Filed: Dec. 29, 2016

(65) Prior Publication Data

US 2017/0108715 A1 Apr. 20, 2017

Related U.S. Application Data

(60) Provisional application No. 62/327,261, filed on Apr. 25, 2016.

(51) Int. Cl.
| | |
|---|---|
| *G02C 1/00* | (2006.01) |
| *G02C 11/00* | (2006.01) |
| *H04W 4/22* | (2009.01) |
| *H04W 4/14* | (2009.01) |
| *G02C 5/14* | (2006.01) |
| *H04W 84/04* | (2009.01) |

(52) U.S. Cl.
CPC ............... *G02C 11/10* (2013.01); *G02C 5/14* (2013.01); *H04W 4/14* (2013.01); *H04W 4/22* (2013.01); *H04M 2250/10* (2013.01); *H04W 84/042* (2013.01)

(58) Field of Classification Search
CPC .......... G02C 11/10; G02C 5/14; H04W 4/14; H04W 4/22; H04W 84/042; H04M 2250/10
USPC ................................................... 351/41, 158
See application file for complete search history.

(56) References Cited

U.S. PATENT DOCUMENTS

| | | | | |
|---|---|---|---|---|
| 9,494,807 | B2* | 11/2016 | Jannard | H04N 9/3173 |
| 9,720,258 | B2* | 8/2017 | Reyes | G02C 11/10 |
| 2013/0242262 | A1* | 9/2013 | Lewis | G02B 27/0093 |
| | | | | 351/209 |

* cited by examiner

*Primary Examiner* — Tuyen Tra
(74) *Attorney, Agent, or Firm* — Barry Choobin; Patent 360

(57) ABSTRACT

The embodiments herein provide an eyewear with an improved structure for temple. The eyewear comprises a cellular communication module and a push button mounted in the pair of temples. The cellular communication module is configured to provide wireless communication between the eyewear and a computing device for tracking GPS location coordinates of the eyewear. The eyewear is tracked by the computing device using an identification number programmed in the cellular communication module. The eyewear is tracked by identifying GPS location coordinates of the eyewear using an eyewear detecting application in the computing device. Further, the push button is configured to make emergency calls to a plurality of emergency contact numbers programmed in the cellular communication module. The push button enables to make an emergency call during an emergency occurred to the user of the eyewear.

16 Claims, 4 Drawing Sheets

EYEWEAR WITH A CELLULAR GPS MODULE

BACKGROUND

Technical Field

The embodiments herein are generally related to structure of eyewear such as sunglasses. The embodiments herein are particularly related to an eyewear with a wireless communicator. The embodiments herein are especially related an eyewear enabling tracking when lost or misplaced.

Description of the Related Art

Eyewear has become an indispensable part of people's daily life. People use eyewear in accordance to the requirement of various purposes. Generally, people wear different types of eyewear for various purpose including reading, working, sports, eye protection, fashion purposes and the like. The different types of eyewear include perception glasses, sun glasses, goggles and the like. Thus, almost all the people carry at least one type of eyewear daily.

However, carrying the eyewear safely is a burden for many people as eyewear always tend to get lost, misplaced, broken or fall off a user. Often the eyewear is kept in pockets, or handbags or wallets. However, keeping the eyewear in pockets has high risk of being fallen off and broken when the user bends. Further, keeping the eyewear in the handbags causes the eyewear to get misplaced and becomes inconvenient for user to find out the eyewear when need arises. People have come up with different ideas to keep the eyewear from being broken or fall off a user. Typically, straps are used to hang the eyewear down on the user's chest to prevent the eyewear from being fall off the user. Further, the eyewear is made of unbreakable materials to prevent breakage.

However, the problems of eyewear being lost or misplaced are yet to be solved still now. With the advancement in the technologies, people have come up with eyewear having Bluetooth and RFID tag that enables the tracking of the eyewear. The eyewear with Bluetooth connection is capable of being tracked by other electronic devices with Bluetooth connection in the nearby vicinity. However, tracking of eyewear with Bluetooth is restricted to a particular range. Further, the eyewear with RFID tag is also capable of being tracked by the user. Such eyewear comprises an RFID tag and a beeper in the frame or temple of the eyewear. The user of the glasses is capable of activating the beeper on the eyewear using a reader. The user is enabled to identify the eyewear from the place where the user hears the sound of the beeper. However, tracking of the eyewear with the RFID tags are possible only when the user is in the vicinity to hear the sound of the beeper.

Hence, there is a need for an improved eyewear capable of being tracked and found from anywhere across the world. There is also a need to enable a tracking of the eyewear using a computing device. Further, there is a need for an improved eyewear acting as a life saving device. There is a need for an improved eyewear enabling a first responder to make an emergency call during an emergency occurred to the user of the eyewear. Still further, there is also a need an eyewear capable of notifying the relatives and friends in case of an emergency.

The above mentioned shortcomings, disadvantages and problems are addressed herein and which will be understood by reading and studying the following specification.

OBJECTS OF THE EMBODIMENTS

The primary object of the embodiments herein is to provide an improved eyewear capable of being tracked and found from anywhere across the world.

Another object of the embodiments herein is to provide an improved eyewear capable of being tracked from an iOS, Android system, a computer and the like.

Yet another object of the embodiments herein is to provide an improved eyewear with a cellular communication module capable of being tracked and found from anywhere across the world with a cellular service.

Yet another object of the embodiments herein is to provide an improved eyewear enabling a first responder to make emergency calls to pre-programmed contact numbers during an emergency.

Yet another object of the embodiments herein is to provide an improved eyewear comprising a push button capable of making emergency call, thereby enabling first responders to pin point the location of user and seek assistance in case of an emergency.

Yet another object of the embodiments herein is to provide an improved eyewear capable of being tracked when left in a purse or a stolen car using a mobile phone.

Yet another object of the embodiments herein is to provide an improved eyewear comprising a battery for providing electric power for making emergency calls.

Yet another object of the embodiments herein is to provide an improved eyewear comprising a cellular communication module providing connectivity between the eyewear and an electronic device to enable tracking.

Yet another object of the embodiments herein is to provide an improved eyewear with pocket doors enabling the electronics components to be removed for maintenance.

Yet another object of the embodiments herein is to provide an improved eyewear with pocket doors and removable covers enabling the cellular communication module to be serviced and updated.

Yet another object of the embodiments herein is to provide an improved eyewear with pocket doors and removable covers enabling the user to replace battery as and when required.

Yet another object of the embodiments herein is to provide an improved eyewear comprises a cellular communication module working on Global positioning system (GPS) capable of using low orbiting satellite service for tracking an eyewear in the case of unavailability of cellular service.

Yet another object of the embodiments herein is to provide an improved eyewear capable of accommodating the electronic components in a pair of temple of the eyewear.

Yet another object of the embodiments herein is to provide an improved eyewear comprising a low voltage light hidden on the frame providing notification regarding the status of emergency calls.

These and other objects and advantages of the embodiments herein will become readily apparent from the following detailed description taken in conjunction with the accompanying drawings.

SUMMARY

The objects and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments of the present invention provide an eyewear with an improved structure for temples in eye glass frames.

According to an embodiment herein, an eyewear/eye glass frame structure is provided. The eyewear structure comprises a first pocket provided in a first temple. The first pocket is formed with a first pair of removable covers. A second pocket is provided in a second temple. The second pocket is formed with a second pair of removable covers. A cellular communication module is mounted in the first pocket provided in the first temple. The cellular communication module comprises a wireless communication module configured to provide wireless communication between the eyewear and a computing device for tracking GPS location coordinates of the eyewear. A push button is embedded in the first temple. The push button is configured to generate emergency calls through the cellular communication module to a plurality of emergency contact numbers during an emergency. The plurality of emergency contact numbers is stored in the cellular communication module. The emergency calls are made by pressing the push button for two seconds. A battery is housed inside the second pocket provided in the second temple. The battery is configured for supplying electrical power to the cellular communication module and the push button. The first pair of removable covers are provided for removing the cellular communication module and push button for maintenance. The second pair of removable covers are provided for replacing the battery.

According to an embodiment herein, the eyewear is tracked by the computing device using an identification number programmed in the cellular communication module.

According to an embodiment herein, the eyewear is tracked by identifying GPS location coordinates of the eyewear with an identification number of the cellular communication module through an eyewear detecting application. The eyewear detecting application is installed in the computing device.

According to an embodiment herein, the computing device is selected from a group consisting of smart phone, i-phone, tablet, laptop, and computer.

According to an embodiment herein, the push button is configured to generate emergency calls to the plurality of emergency contact numbers.

According to an embodiment herein, the push button is further configured to cancel the emergency calls by double tapping the push button within ten seconds after generating the emergency call.

According to an embodiment herein, the push button is further configured to send alert SMS comprising GPS location coordinates of the eyewear to the emergency contact numbers within three minutes after generating the emergency call.

According to an embodiment herein, the battery supplies electrical power to the cellular communication module for generating a heartbeat once in every ten hours.

According to an embodiment herein, the battery is configured to supply electrical power to the push button, whenever the emergency call is made.

According to an embodiment herein, the first removable cover is removed to access and remove the cellular communication module for maintenance service and updating operation.

According to an embodiment herein, wherein the plurality of emergency contact number includes emergency number, and contact telephone numbers of friends and relatives.

According to an embodiment herein, the plurality of emergency contact telephone numbers stored in the cellular communication module for making emergency calls and sending alert SMS is chosen by the user.

According to an embodiment herein, the eyewear further comprises a low voltage light embedded on a first lens holder of the eyewear for providing notification regarding a status of an emergency call.

According to an embodiment herein, the eyewear further comprises a micro speaker configured for answering an emergency call.

According to an embodiment herein, the eyewear further comprises a microphone for enabling a user to make the emergency call.

According to an embodiment herein, the pair of first removable cover is fixed on the first pocket through a pair of screws and wherein the pair of first removable cover is fixed on the first pocket through another pair of screws.

The various embodiments of the present invention provide an eyewear with an improved structure for temples in eye glass frames. The eyewear comprises a removable cover provided in both the temples. A cellular communication module and a push button is provided in the removable cover mounted in one temple while a battery is provided in the removable cover mounted in another temple. The cellular communication module comprises a wireless communication device to establish a wireless communication between the eyewear and a computing device of the user. The user is enabled to track the GPS location coordinates of the eyewear using an eyewear detecting application in the computing device. Further, the push button enables a first responder to make emergency call for seeking assistance during an emergency occurred to the user of the eyewear.

According to an embodiment herein, an eyewear with an improved structure of temple in eye glass frames is provided. The eyewear comprises a cellular communication module, a push button, a battery, a pair of removable covers and a plurality of screws. The cellular communication module is configured to provide wireless communication between the eyewear and a computing device for tracking GPS location coordinates of the eyewear. The cellular communication module is embedded inside a first pocket door in a first temple among the pair of temples. The push button embedded in the first temple is configured to make emergency calls to a plurality of emergency contact numbers programmed in the cellular communication module during an emergency. The emergency calls are made by pressing the push button continuously for two complete seconds. The battery provides electric power to the cellular communication module and the push button. The battery is embedded inside a second pocket door in a second temple among the pair of temple. The pair of removable covers is configured for enabling the cellular communication module and push button to be removed for maintenance. The pair of removable covers comprises a first removable cover covering the cellular communication module and a second removable cover covering the battery. The plurality of screws is configured for fixing the pair of removable covers onto the pair of temple of the eyewear. The first removable cover is fixed on the first pocket door and a second removable cover is fixed on the second pocket door.

According to an embodiment herein, the eyewear is tracked by the computing device using an identification number programmed in the cellular communication module.

According to an embodiment herein, the eyewear is tracked by identifying GPS location coordinates of the eyewear having the identification number using an eyewear detecting application in the computing device.

According to an embodiment herein, the eyewear is tracked by the computing device selected from a group consisting of smart phone, i-phone, tablet, laptop, computer and the like.

According to an embodiment herein, the push button is further configured to cancel the emergency calls by double tapping the push button within ten seconds after generating the emergency call.

According to an embodiment herein, the push button is further configured to send alert SMS comprising GPS location coordinates of the user to the emergency contact numbers within three minutes after generating the emergency call.

According to an embodiment herein, the battery supplies electrical power to the cellular communication module generating a heartbeat once in every ten hours.

According to an embodiment herein, the battery supplies electrical power to the push button whenever the emergency call is made.

According to an embodiment herein, the first removable cover enables a removal of the cellular communication module for maintenance including service and updating.

According to an embodiment herein, the second removable cover enables the battery to be removed for replacement.

According to an embodiment herein, the plurality of emergency contact number includes emergency number 911, and contact number of friends and relatives.

According to an embodiment herein, the plurality of emergency contact number programmed in the cellular communication module for making emergency calls and sending alert SMS is chosen by the user.

According to an embodiment herein, tracking of the eyewear enables a user to track a stolen purse/stolen car comprising the eyewear.

According to an embodiment herein, the eyewear further comprises a low voltage light embedded on a first lens holder of the eyewear for providing notification regarding the status of an emergency call.

According to an embodiment herein, the eyewear further comprises a micro speaker configured for answering an emergency call.

According to an embodiment herein, the eyewear further comprises a microphone enabling a user to make the emergency call.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Figure 1A:
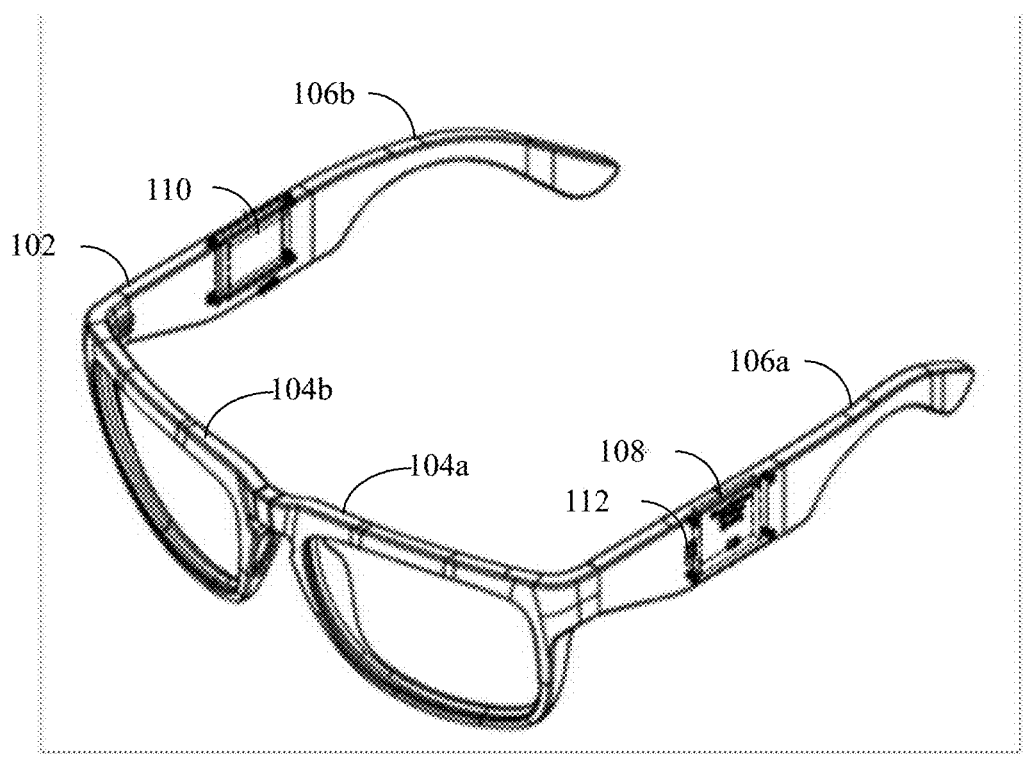
FIG. 1A illustrates a side view of an improved eyewear, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of the present invention provide an eyewear with an improved structure for temples in eye glass frames.

According to an embodiment herein, an eyewear/eye glass frame structure is provided. The eyewear structure comprises a first pocket provided in a first temple. The first pocket is formed with a first pair of removable covers. A second pocket is provided in a second temple. The second pocket is formed with a second pair of removable covers. A cellular communication module is mounted in the first pocket provided in the first temple. The cellular communication module comprises a wireless communication module configured to provide wireless communication between the eyewear and a computing device for tracking GPS location coordinates of the eyewear. A push button is embedded in the first temple. The push button is configured to generate emergency calls through the cellular communication module to a plurality of emergency contact numbers during an emergency. The plurality of emergency contact numbers is stored in the cellular communication module. The emergency calls are made by pressing the push button for two seconds. A battery is housed inside the second pocket provided in the second temple. The battery is configured for supplying electrical power to the cellular communication module and the push button. The first pair of removable covers are provided for removing the cellular communication module and push button for maintenance. The second pair of removable covers are provided for replacing the battery.

According to an embodiment herein, the eyewear is tracked by the computing device using an identification number programmed in the cellular communication module.

According to an embodiment herein, the eyewear is tracked by identifying GPS location coordinates of the eyewear with an identification number of the cellular communication module through an eyewear detecting application. The eyewear detecting application is installed in the computing device.

According to an embodiment herein, the computing device is selected from a group consisting of smart phone, i-phone, tablet, laptop, and computer.

According to an embodiment herein, the push button is configured to generate emergency calls to the plurality of emergency contact numbers.

According to an embodiment herein, the push button is further configured to cancel the emergency calls by double tapping the push button within ten seconds after generating the emergency call.

According to an embodiment herein, the push button is further configured to send alert SMS comprising GPS location coordinates of the eyewear to the emergency contact numbers within three minutes after generating the emergency call.

According to an embodiment herein, the battery supplies electrical power to the cellular communication module for generating a heartbeat once in every ten hours.

According to an embodiment herein, the battery is configured to supply electrical power to the push button, whenever the emergency call is made.

According to an embodiment herein, the first removable cover is removed to access and remove the cellular communication module for maintenance service and updating operation.

According to an embodiment herein, wherein the plurality of emergency contact number includes emergency number, and contact telephone numbers of friends and relatives.

According to an embodiment herein, the plurality of emergency contact telephone numbers stored in the cellular communication module for making emergency calls and sending alert SMS is chosen by the user.

According to an embodiment herein, the eyewear further comprises a low voltage light embedded on a first lens holder of the eyewear for providing notification regarding a status of an emergency call.

According to an embodiment herein, the eyewear further comprises a micro speaker configured for answering an emergency call.

According to an embodiment herein, the eyewear further comprises a microphone for enabling a user to make the emergency call.

According to an embodiment herein, the pair of first removable cover is fixed on the first pocket through a pair of screws and wherein the pair of first removable cover is fixed on the first pocket through another pair of screws.

According to an embodiment herein, an eyewear with an improved structure of temple in eye glass frames is provided. The eyewear comprises a cellular communication module, a push button, a battery, a pair of removable covers and a plurality of screws. The cellular communication module is configured to provide wireless communication between the eyewear and a computing device for tracking GPS location coordinates of the eyewear. The cellular communication module is embedded inside a first pocket door in a first temple among the pair of temples. The push button embedded in the first temple is configured to make emergency calls to a plurality of emergency contact numbers programmed in the cellular communication module during an emergency. The emergency calls are made by pressing the push button continuously for two complete seconds. The battery provides electric power to the cellular communication module and the push button. The battery is embedded inside a second pocket door in a second temple among the pair of temple. The pair of removable covers is configured for enabling the cellular communication module and push button to be removed for maintenance. The pair of removable covers comprises a first removable cover covering the cellular communication module and a second removable cover covering the battery. The plurality of screws is configured for fixing the pair of removable covers onto the pair of temple of the eyewear. The first removable cover is fixed on the first pocket door and a second removable cover is fixed on the second pocket door.

According to an embodiment herein, the eyewear is tracked by the computing device using an identification number programmed in the cellular communication module.

According to an embodiment herein, the eyewear is tracked by identifying GPS location coordinates of the eyewear having the identification number using an eyewear detecting application in the computing device.

According to an embodiment herein, the eyewear is tracked by the computing device selected from a group consisting of smart phone, i-phone, tablet, laptop, computer and the like.

According to an embodiment herein, the push button is further configured to cancel the emergency calls by double tapping the push button within ten seconds after generating the emergency call.

According to an embodiment herein, the push button is further configured to send alert SMS comprising GPS location coordinates of the user to the emergency contact numbers within three minutes after generating the emergency call.

According to an embodiment herein, the battery supplies electrical power to the cellular communication module generating a heartbeat once in every ten hours.

According to an embodiment herein, the battery supplies electrical power to the push button whenever the emergency call is made.

According to an embodiment herein, the first removable cover enables a removal of the cellular communication module for maintenance including service and updating.

According to an embodiment herein, the second removable cover enables the battery to be removed for replacement.

According to an embodiment herein, the plurality of emergency contact number includes emergency number 911, and contact number of friends and relatives.

According to an embodiment herein, the plurality of emergency contact number programmed in the cellular communication module for making emergency calls and sending alert SMS is chosen by the user.

According to an embodiment herein, tracking of the eyewear enables a user to track a stolen purse/stolen car comprising the eyewear.

According to an embodiment herein, the eyewear further comprises a low voltage light embedded on a first lens holder of the eyewear for providing notification regarding the status of an emergency call.

According to an embodiment herein, the eyewear further comprises a micro speaker configured for answering an emergency call.

According to an embodiment herein, the eyewear further comprises a microphone enabling a user to make the emergency call.

Figure 1B:
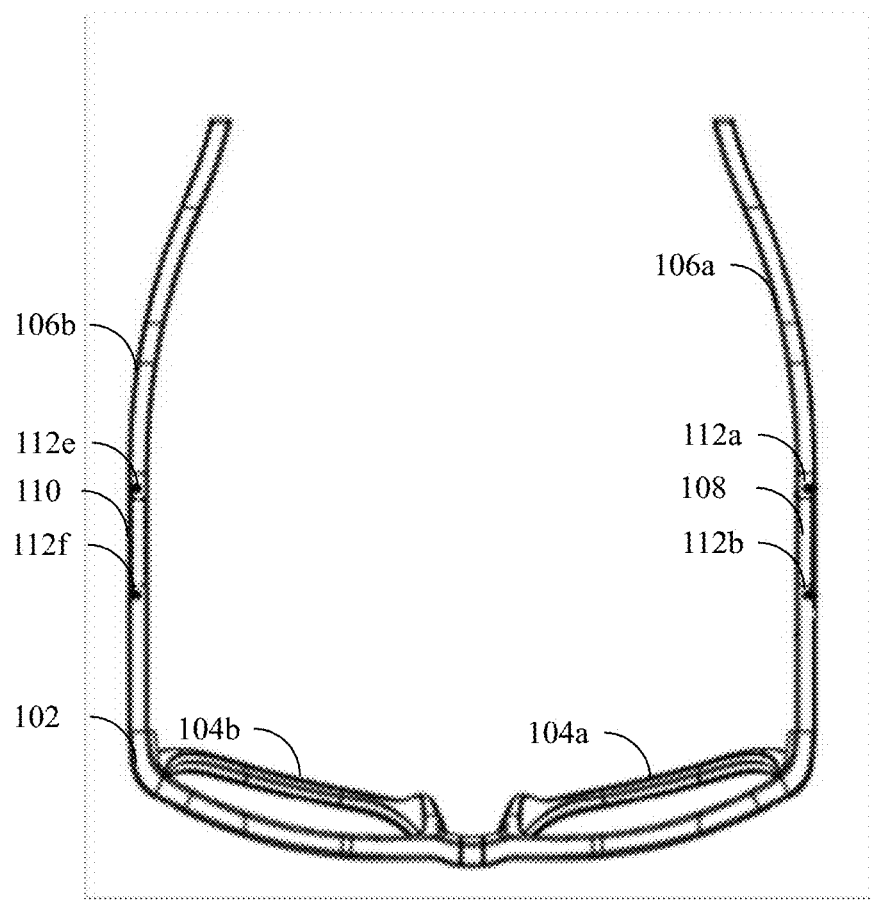
FIG. 1B illustrates a top view of an improved eyewear, according to one embodiment herein.
Figure 1C:
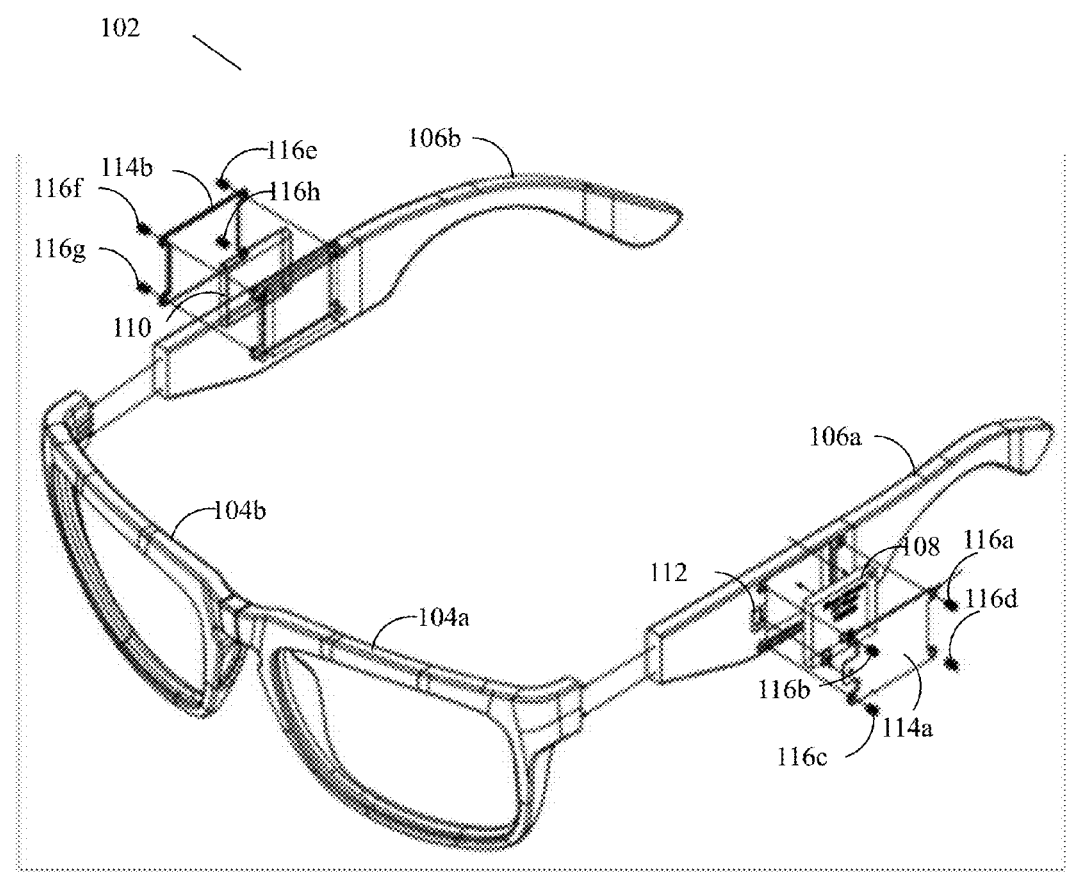
FIG. 1C illustrates an exploded side view of an improved eyewear, according to one embodiment herein.

FIG. 1A illustrates a side view of an improved eyewear, according to one embodiment herein, while FIG. 1B illustrates a top view of an improved eyewear, according to one embodiment herein, and FIG. 1C illustrates an exploded side view of an improved eyewear, according to one embodiment herein. With respect to FIG. 1A-FIG. 1C, the improved structure of the eyewear 102 enables a user to track the eyewear when lost or misplaced. The eyewear 102 comprises a pair of lens holders 104a and 104b and a pair of temple 106a and 106b. The pair of lens holders 104a and 104b comprises a first lens holder 104a receiving a first lens and a second lens holder 104b receiving a second lens. The pair of temple 106a and 106b comprises a first temple 106a attached to the first lens holder 104a and a second temple 106b attached to the second lens holder 104b. A removable cover is provided in the pair of temple 106a and 106b. The pair of temples comprises a cellular communication module 108, a battery 110, a push button 112, a pair of removable cover 114a and 114b, and a plurality of screws 116a, 116b . . . 116h.

The first temple 106a comprises a first pocket door holding the cellular communication module 108. The cellular communication module acts as a wireless communicator working on Global positioning system (GPS). The cellular communication module 108 includes any Federal Communications Commission (FCC) chip. For example, the cellular communication module 108 is a Sierra wireless air prime #WS6318. The cellular communication module 108 enables wireless communication between the eyewear 102 and an external computing device. The external computing device is selected from a group consisting of smart phone, i-phone, tablet, laptop, computer etc. The external computing device is an iOS, Android or a computer system. The external computing device comprises an eyewear detecting application installed for tracking the eyewear 102. The user is enabled to activate the eyewear detecting application by tapping on an icon for eyewear detecting application on the external computing device.

On activating the eyewear detecting application, the external computing device communicates with the cellular communication module 108 in the eyewear 102. The eyewear detecting application tracks the GPS location coordinates of the eyewear 102 using an identification number programmed in the cellular communication module 108. Therefore, user is enabled to track the eyewear 102 using the GPS location coordinates from anywhere across the world without the limitation of a particular range. The cellular communication module 108 working on Global positioning system (GPS) is capable of using low orbiting satellite service for tracking an eyewear in the case of unavailability of cellular service. The user is enabled to detect eyewear 102 when eyewear 102 is lost in a stolen purse or a stolen car. Therefore, the eyewear 102 enables the identification of location coordinates of the objects holding the eyewear 102. Further, a third person knowing the identification number of the eyewear 102 is enabled to track the user of the eyewear 102. The third person is able to track the user using the eyewear detecting application installed in the third person's computing device.

Further, the cellular communication module 108 is programmed with a plurality of emergency contact numbers. The plurality of emergency contact numbers includes the emergency number 911, and contact number of user's relatives or friends. The plurality of emergency contact numbers is programmed in the cellular communication module 108 to enable a first responder to seek assistance during an emergency occurred to the user of the eyewear 102. The eyewear 102 also comprises the push button 112 coupled to the cellular communication module 108. The push button 112 enables the first responder to make emergency calls or send alert SMS to the emergency contact numbers during the emergency.

During an emergency, the first responder is enabled to press the push button 112 for two complete seconds to initiate an emergency call to the emergency number 911. The emergency includes an accident or deterioration in health condition of the user etc. Therefore, the first responder is enabled to report that an emergency has occurred and provide the details regarding the emergency. On making the emergency call, the first responder is enabled to seek assistance for the emergency occurred. The eyewear 102 further comprises a microphone and a micro speaker for enabling a first responder to make emergency calls. Further, the user is capable of selecting the other pre-programmed numbers in cellular communication module 108 for generating the emergency call.

Further, an alert SMS indicating the location coordinates of the user is sent to the plurality of emergency contact numbers. The alert SMS is sent to the plurality of emergency contacts within three seconds after generating the emergency calls. Therefore the relatives and friends of the user are notified regarding the emergency occurred to the user of the eyewear 102. In situations where an emergency call is made accidently by the user, the user is enabled to cancel the emergency call by double tapping the push button 112 within 10 seconds the emergency call is made. Further, low voltage lights are embedded on the eyewear 102 to notify the user regarding the status of the emergency call.

The first pocket door on the first temple 106a comprising the cellular communication module 108 is closed using a first removable cover 114a. The first removable cover 114a is fixed to the first pocket door using the plurality of screws 116a, 116b, 116c and 116d. The eyewear 102 comprises the battery 110 inside a second pocket door on the second temple 106b. The battery 110 is configured to provide the cellular communication module 108 a heartbeat once every 10 hours. Further, the battery 110 provides electric power to make the emergency call to track the eyewear 102. The charge of the battery 110 would likely last the lifetime of the eyewear 102. The battery 110 is placed in the second pocket door with the second removable cover 114b. The second removable cover 114b is attached to the second pocket door using the of screws 116e, 116f, 116g and 116h. The first removable cover 114a enables the cellular communication module 108 to be removed for service. Further, the cellular communication module 108 is reprogrammed or updated. Further the second removable cover 114b enables the battery 110 to be changed.

Figure 2:
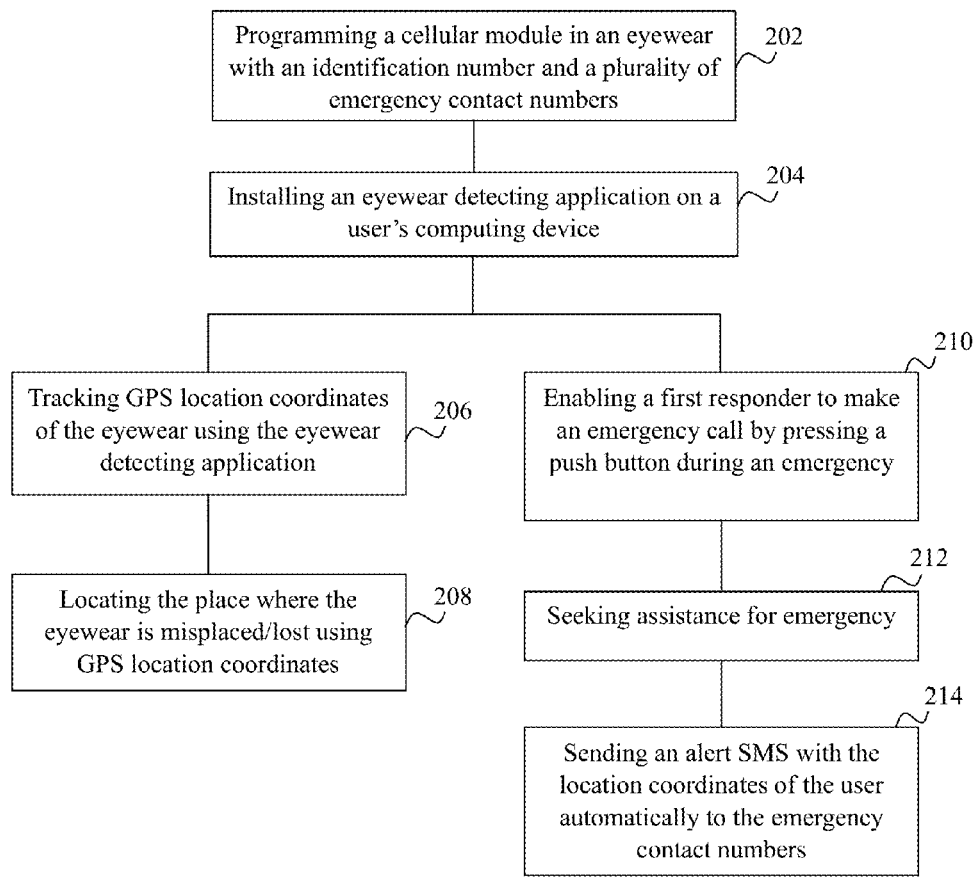
FIG. 2 illustrates a flow chart explaining a method of tracking an eyewear, according to one embodiment herein.

FIG. 2 illustrates a flow chart explaining a method of tracking an eyewear, according to one embodiment herein. The method comprises programming a cellular communication module in an eyewear with an identification number and a plurality of emergency contact numbers (202). The plurality of emergency contact number includes emergency number 911, user's contact number and contact number of friends and relatives. The emergency contact numbers programmed in the cellular communication module is chosen by the user. The identification number enables a user to track the eyewear using a computing device An eyewear detecting application is installed in the computing device (204). On activating the eyewear detecting application, the computing device establishes wireless communication with the cellular communication module in the eyewear. The eyewear detecting application tracks the GPS location coordinates of the eyewear (206). Further the location of the place where the eyewear is lost, is identified using the GPS location coordinates (208). Thus the user of the eyewear is enabled to find the eyewear when lost or misplaced anywhere. The method of tracking the eyewear is not limited to the distance between the eyewear and the computing device as the communication is a GPS wireless communication.

A first responder is enabled to make an emergency call by pressing a push button during an emergency occurred to the user of the eyewear (210). The push button when pressed continuously for two complete seconds generates the emergency call to the emergency contact numbers programmed in the cellular communication module. The emergency call is made to the emergency number 911. Further, the user is also enabled to choose another number among the emergency contact numbers to direct the emergency call while programming the cellular communication module. Thus, the method enabled the first responders to seek assistance during the emergency (212). The eyewear comprises a microphone and micro speaker for enabling the first responder to make emergency call and collect the details. Further, when an emergency call is made accidently, the user is enabled to cancel the emergency call by double tapping the push button within ten seconds of making the emergency call.

Further, an alert SMS indicating the location coordinates of the user of the eyewear is automatically sent to the emergency contact numbers (214). The alert SMS is sent from the cellular communication module within three minutes of making the emergency call. The alert SMS is sent to notify the relatives and friends regarding the emergency and provides the location coordinates of the user.

The improved structure of the eyewear enables the tracking of eyewear when lost or misplaced. The improved structure of the eyewear enables a user to track the eyewear without the limitation of the distance. The eyewear comprises a cellular communication module enabling wireless communication with external computing device. Hence, the eyewear is capable of being tracked from anywhere across the world with cellular service. Further, the cellular communication module is a GPS component. Hence the cellular communication module is capable of using low orbiting satellite service for tracking an eyewear in the case of unavailability of cellular service. Thus the eyewear is capable of being tracked from anywhere across the world.

Further, the improved structure of the eyewear enables a first responder to generate an emergency call during an emergency occurred to the user of the eyewear. The first responder is enabled to pick up the eyewear and press the push button for making emergency calls to a plurality of emergency contact numbers preprogrammed in the cellular communication module of the eyewear. Further, alert SMS are sent to the relatives and friends notifying that an emergency has occurred and provides details regarding the location where emergency has occurred. Thus the eyewear acts as a life saving device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. An eyewear/eye glass frame structure comprising:
   a first pocket provided in a first temple, and wherein the first pocket is formed with a first pair of removable covers;
   a second pocket provided in a second temple, and wherein the second pocket is formed with a second pair of removable covers;
   a cellular communication module mounted in the first pocket provided in the first temple, and wherein the cellular communication module comprises a wireless communication module configured to provide wireless communication between the eyewear and a computing device for tracking GPS location coordinates of the eyewear;
   a push button embedded in the first temple, and wherein the push button is configured to generate emergency calls through the cellular communication module to a plurality of emergency contact numbers during an emergency, and wherein the plurality of emergency contact numbers is stored in the cellular communication module, wherein the emergency calls are made by pressing the push button for two seconds;
   a battery housed inside the second pocket provided in the second temple, and wherein the battery is configured for supplying electrical power to the cellular communication module and the push button;
   wherein the first pair of removable covers are provided for removing the cellular communication module and push button for maintenance, wherein the second pair of removable covers are provided for replacing the battery.

2. The eyewear structure according to claim 1, wherein the eyewear is tracked by the computing device using an identification number programmed in the cellular communication module.

3. The eyewear structure according to claim 1, wherein the eyewear is tracked by identifying GPS location coordinates of the eyewear with an identification number of the cellular communication module through an eyewear detecting application, and wherein the eyewear detecting application is installed in the computing device.

4. The eyewear structure according to claim 1, wherein the computing device is selected from a group consisting of smart phone, i-phone, tablet, laptop and computer.

5. The eyewear structure according to claim 1, wherein the push button is configured to generate emergency calls to the plurality of emergency contact numbers.

6. The eyewear structure according to claim 1, wherein the push button is further configured to cancel the emergency calls by double tapping the push button within ten seconds after generating the emergency call.

7. The eyewear structure according to claim 1, wherein the push button is further configured to send alert SMS comprising GPS location coordinates of the eyewear to the emergency contact numbers within three minutes after generating the emergency call.

8. The eyewear structure according to claim 1, wherein the battery supplies electrical power to the cellular communication module for generating a heartbeat once in every ten hours.

9. The eyewear structure according to claim 1, wherein the battery is configured to supply electrical power to the push button, whenever the emergency call is made.

10. The eyewear structure according to claim 1, wherein the first removable cover is removed to access and remove the cellular communication module for maintenance service and updating operation.

11. The eyewear structure according to claim 1, wherein the plurality of emergency contact number includes emergency number, and contact telephone numbers of friends and relatives.

12. The eyewear structure according to claim 1, wherein the plurality of emergency contact telephone numbers stored in the cellular communication module for making emergency calls and sending alert SMS is chosen by the user.

13. The eyewear structure according to claim 1, further comprises a low voltage light embedded on a first lens holder of the eyewear for providing notification regarding a status of an emergency call.

14. The eyewear structure according to claim 1, further comprises a micro speaker configured for answering an emergency call.

15. The eyewear structure according to claim 1, further comprises a microphone for enabling a user to make the emergency call.

16. The eyewear structure according to claim 1, wherein the pair of first removable cover is fixed on the first pocket through a pair of screws and wherein the pair of first removable cover is fixed on the first pocket through another pair of screws.

* * * * *